(12) United States Patent
Schmidt et al.

(10) Patent No.: US 9,145,179 B1
(45) Date of Patent: Sep. 29, 2015

(54) METHOD FOR CONVERTING AN EXISTING VEHICLE TO A WHEELCHAIR-ACCESSIBLE CONVERTED VEHICLE

(71) Applicant: Vantage Mobility International, LLC, Phoenix, AZ (US)

(72) Inventors: Michael J. Schmidt, Queen Creek, AZ (US); Phil Gerlings, Chandler, AZ (US); David Nulph, Phoenix, AZ (US)

(73) Assignee: Vantage Mobility International, LLC, Phoenix, AZ (US)

( * ) Notice: Subject to any disclaimer, the term of this patent is extended or adjusted under 35 U.S.C. 154(b) by 0 days.

(21) Appl. No.: 14/719,002

(22) Filed: May 21, 2015

Related U.S. Application Data

(62) Division of application No. 13/546,968, filed on Jul. 11, 2012, now Pat. No. 9,056,038.

(60) Provisional application No. 61/507,065, filed on Jul. 12, 2011.

(51) Int. Cl.
  *A61G 3/08* (2006.01)
  *B62D 65/14* (2006.01)
  *B62D 65/12* (2006.01)
  *B62D 65/10* (2006.01)
  *B60K 13/04* (2006.01)
  *A61G 3/06* (2006.01)
  *B60N 2/30* (2006.01)

(52) U.S. Cl.
  CPC .............. *B62D 65/14* (2013.01); *A61G 3/0808* (2013.01); *B60K 13/04* (2013.01); *B62D 65/10* (2013.01); *B62D 65/12* (2013.01); *A61G 3/066* (2013.01); *B60G 2206/911* (2013.01); *B60N 2/3047* (2013.01)

(58) Field of Classification Search
  CPC .......... A61G 3/02; A61G 3/06; A61G 3/061; A61G 3/062; A61G 3/065; A61G 3/066; A61G 3/0808; B60G 2800/202; B60G 2206/911; B62D 25/20; B60K 13/04
  See application file for complete search history.

(56) References Cited

U.S. PATENT DOCUMENTS

| | | | | |
|---|---|---|---|---|
| 4,763,953 A | * | 8/1988 | Chalin | 298/17 S |
| 4,847,972 A | * | 7/1989 | Anderson et al. | 29/401.1 |
| 5,137,413 A | * | 8/1992 | Ressler | 414/474 |
| 5,573,266 A | * | 11/1996 | Zalewski et al. | 280/6.151 |
| 5,800,015 A | * | 9/1998 | Tsuchiya et al. | 297/331 |
| 6,071,064 A | * | 6/2000 | Hackett | 414/545 |
| 6,098,995 A | * | 8/2000 | Danis | 280/6.152 |
| 6,260,652 B1 | * | 7/2001 | Steenackers et al. | 180/296 |
| 6,439,587 B2 | * | 8/2002 | Fabris | 280/124.11 |
| 7,303,042 B2 | * | 12/2007 | Kanehira et al. | 180/291 |
| 7,396,028 B2 | * | 7/2008 | Smith | 280/124.116 |
| 7,641,209 B2 | * | 1/2010 | Watters | 280/124.109 |
| 7,837,203 B1 | * | 11/2010 | Schmidt et al. | 280/6.152 |
| 8,029,001 B2 | * | 10/2011 | Kim | 280/5.509 |
| 8,459,666 B2 | * | 6/2013 | Piehl et al. | 280/86.5 |
| 8,807,575 B2 | * | 8/2014 | Bartel et al. | 280/6.152 |
| 8,851,492 B2 | * | 10/2014 | Andreasen et al. | 280/124.157 |
| 2013/0330157 A1 | * | 12/2013 | Asztalos et al. | 414/469 |

* cited by examiner

*Primary Examiner* — Joseph Rocca
*Assistant Examiner* — Emma K Frick
(74) *Attorney, Agent, or Firm* — Fennemore Craig, P.C.

(57) ABSTRACT

Methods for modifying an OEM vehicle into a wheelchair-accessible vehicle. The methods include the steps of removing the OEM rear axle, fabricating a modified rear axle, attaching the modified rear axle, repositioning the secondary catalytic converter, and modifying the floor of an interior compartment of the OEM vehicle. Method steps include installing a body lift kit and lowering the airbox.

16 Claims, 17 Drawing Sheets

METHOD FOR CONVERTING AN EXISTING VEHICLE TO A WHEELCHAIR-ACCESSIBLE CONVERTED VEHICLE

CROSS-REFERENCES TO RELATED APPLICATIONS

This application is a divisional of U.S. patent application Ser. No. 13/546,968, filed Jul. 11, 2012, now U.S. Pat. No. 9,056,038 which claims priority to U.S. Patent Application Ser. No. 61/507,065, filed Jul. 12, 2011, both of which are incorporated herein by reference for all that is disclosed.

FIELD OF THE INVENTION

This invention relates to generally to methods for modifying an Original Equipment Manufacturer ("OEM") vehicle, as well as the modified vehicle with increased floor space, and more specifically to methods for modifying an OEM van, as well as the modified van with increased floor space.

BACKGROUND OF THE INVENTION

Presently, no major automobile manufacturers mass-produce highway vehicles that accommodate wheelchair access for private use. Consequently, these OEM vehicles must be modified and converted to properly accommodate wheelchair access. Wheelchair modifications usually require raising the vehicle's body and lowering the floor. Ideally, the floor of a converted vehicle is flat to allow for wheelchair access and maneuverability inside the vehicle.

BRIEF SUMMARY OF THE INVENTION

In one embodiment, a method for modifying an OEM van according to the present invention, comprises: removing an OEM rear axle from the OEM van, the OEM rear axle comprising a substantially straight axle beam and being positioned forward of a rear wheel spindle attachment; attaching a modified rear axle to a rear section of a rear control arm operatively associated with a rear suspension system of the OEM van; repositioning a secondary catalytic converter forward of a firewall separating an engine compartment from an interior compartment of the OEM van; and modifying a floor of the interior compartment of the OEM van to remove a hump in the floor.

In another embodiment, the method may further comprise fabricating the modified rear axle, the modified rear axle comprising a modified axle beam and a receptacle for receiving a power kneel chain.

In yet another embodiment, fabricating the modified rear axle may comprise: creating a top hole in an upper portion of the modified axle beam; creating a bottom hole in a lower portion of the modified axle beam; and connecting the top hole with the bottom hole by inserting a hollow tube between the top hole and bottom hole, thereby creating the receptacle.

BRIEF DESCRIPTION OF THE DRAWINGS

Illustrative and presently preferred exemplary embodiments of the invention are shown in the drawings in which.

DETAILED DESCRIPTION OF THE INVENTION

Figure 1:
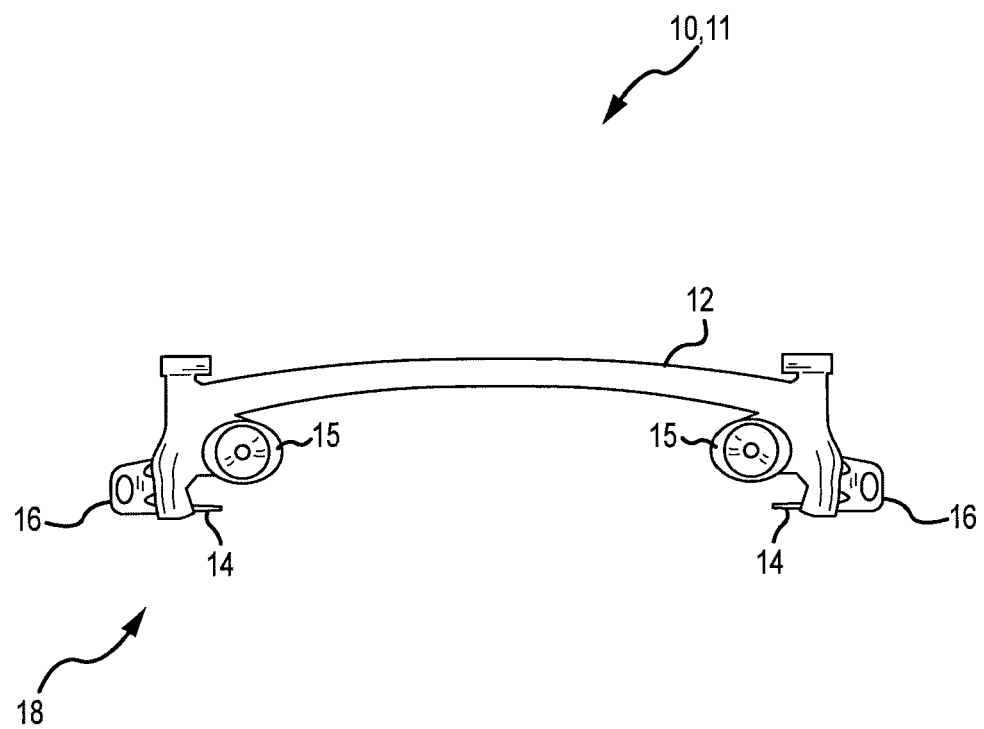
FIG. 1 is an illustration of an OEM rear axle.

The present invention is generally directed to modifications in OEM vehicles that allow for enhanced access into and maneuverability inside the OEM vehicle for handicapped persons. Specifically, the modifications increase the flat floor space in the modified OEM vehicle, while substantially maintaining OEM ride quality, as well as performance and safety characteristics.

OEM vehicles, specifically OEM van 10, often contain components that limit the space available for flat flooring in passenger compartment 26 of OEM van 10. "OEM" refers to original equipment manufacturer, and is used herein as that term is understood to those of ordinary skill in the art. While these components are necessary for the effective and safe operation of a vehicle, flat floor space is minimal and is limited to flat floor space 34 that aligned with side door opening 28 and additional flat floor space 24, both of which are generally forward of OEM rear axle beam 12. The limited flat floor space greatly decreases the ability of a user to maneuver a wheelchair, scooter or other walking aid device (collectively referred to as "wheelchair") inside passenger compartment 26 of OEM van 10. Maneuverability is particularly important in areas of OEM van 10 where the wheelchair user must change direction. For example, wheel chair ramps in minivans are often installed proximal to side door opening 28. The user must roll the wheelchair up the ramp and then abruptly turn the wheelchair upon gaining entry into OEM van 10. Thus, the flooring of the passenger compartment 26 near the side door opening 28 should ideally be flat and comprise a large enough space to accommodate wheelchair maneuvering.

The present invention comprises a modified OEM vehicle (e.g., modified OEM van 100) and method 300 for modifying OEM van 10 to maximize flat floor space (e.g., flat floor space 134 plus additional flat floor space 124) within the modified OEM van 100, rearward of the OEM rear axle beam 12 location, while maintaining the performance and safety characteristics of OEM van 10.

Figure 2:
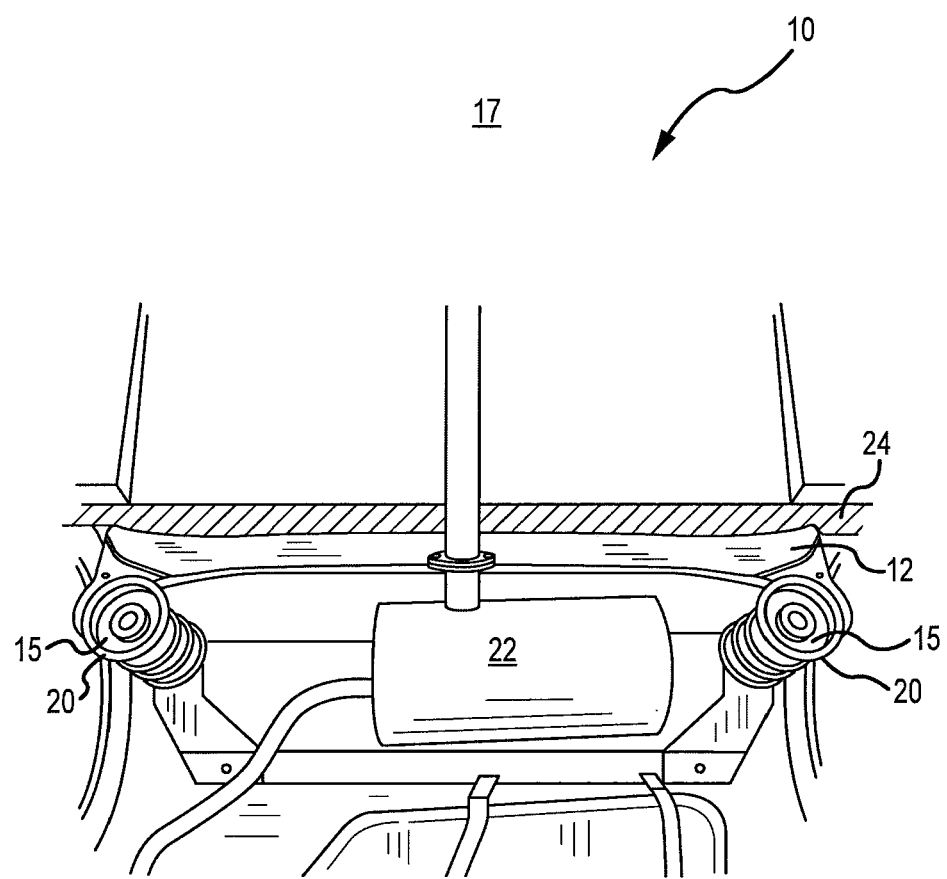
FIG. 2 shows an undercarriage view of an OEM vehicle, illustrating the manner in which the OEM rear axle is installed in the OEM vehicle such that the position of the OEM axle beam limits the amount of flat floor space available in the maneuvering area of the passenger compartment.

The present invention will now be described with reference to embodiments of modified OEM van 100, often in relation to OEM van 10 to be modified. Preferably, the OEM vehicle that is the starting point for the present invention is OEM van 10. As used herein, "van" may refer to any size of van ranging from a minivan to a cargo van. OEM van 10 comprises a solid axle rear suspension, as opposed to an independent rear suspension. OEM van 10 to be modified includes OEM rear axle 11 comprising OEM rear axle beam 12, which has a substantially straight rear axle beam that is a substantially uniform distance from the ground as installed as across its length. The present invention is advantageous where OEM rear axle 11 is positioned forward of a rear wheel spindle attachment 16, as shown in FIGS. 1 and 2. This location of OEM rear axle beam 12 limits additional available flat floor space 24 because the passenger compartment 26 floor (e.g., flat floor space 34 plus additional flat floor space 24) cannot be extended rearward past OEM rear axle beam 12. In one embodiment, OEM van 10 is a front-wheel drive Toyota Sienna minivan, specifically a front-wheel drive 2011. Toyota Sienna minivan.

OEM van 10 comprises front end 17 and rear end 19. Front end 17 refers to the end of OEM van 10 comprising headlights. Rear end 10 refers to the end of OEM van 10 comprising taillights. As used herein, "forward" refers to a location in the direction of front end 17, and "rearward" refers to a location in the direction of rear end 19. OEM van 10 also includes interior space comprising passenger compartment 26, which also includes a driver's seat. Passenger compartment 26 comprises flat floor space 34 and additional flat floor space 24, which together comprise a maneuvering area, when passenger seats are removed. The maneuvering area refers to that portion of passenger compartment 26 available for maneuvering, e.g., maneuvering the wheelchair. With regard to handicapped accessible vehicles, access and wheelchair maneuverability increase with additional flat floor space within the maneuvering area, as will be explained in more detail below.

As described in various embodiments, modified OEM van 100 comprises modified rear axle 101, modified rear seat 130, modified exhaust system 150 and modified airbox 170, each of which will be described with reference to the manner in which they have been modified from OEM van 10.

Figure 3:
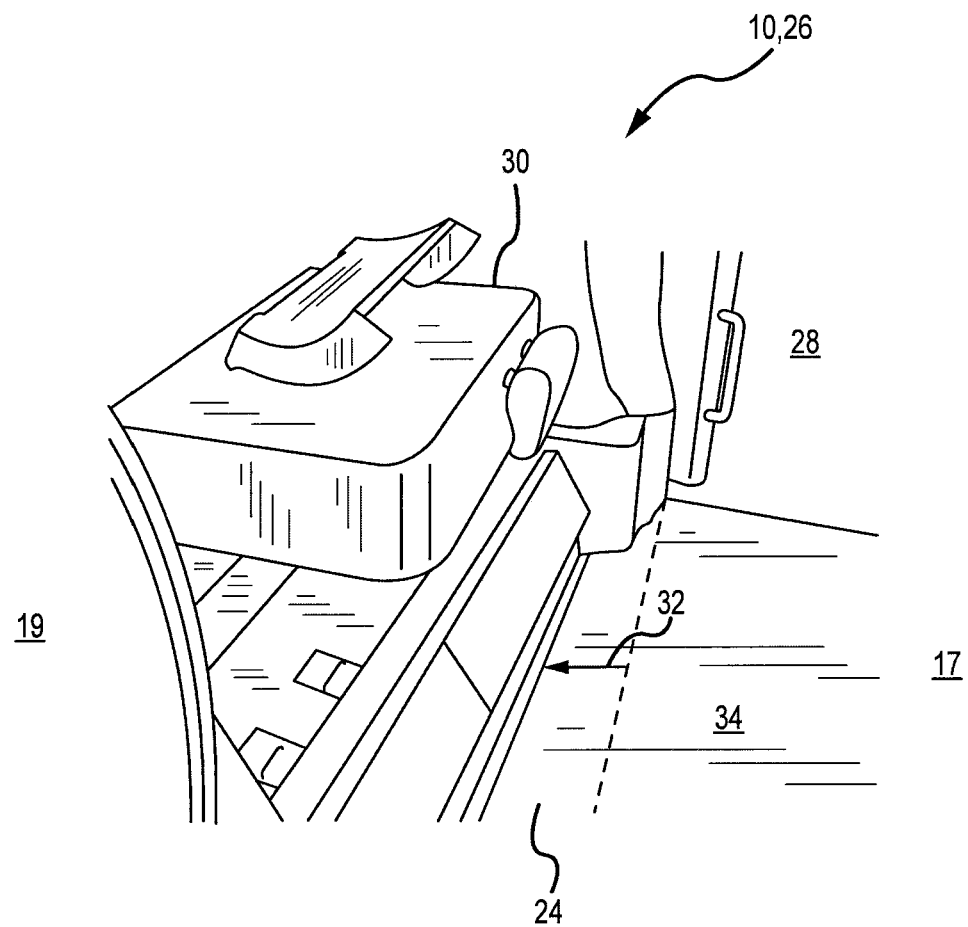
FIG. 3 shows a passenger compartment of an OEM vehicle with limited additional floor space.

A discussion of embodiments of modified rear axle 101 begins with a discussion of OEM rear axle 11, as shown in FIG. 1. As shown in FIG. 1, OEM rear axle 11 is designed with OEM rear axle beam 12 installed forward of attachment assembly 18 which includes pin 14, spindle attachment 16, and coil spring attachment assembly 15. When installed in OEM van 10, as shown in FIGS. 2-3, this location of OEM rear axle beam 12 forward of coil springs 20 limits the amount of additional flat floor space 24 available (see arrow 32) within the maneuvering area of OEM van 10, as well as prior art wheelchair-converted vehicles. Accordingly, the user may find it difficult to maneuver the wheelchair upon entering OEM van 10 through side door opening 28.

Figure 4:
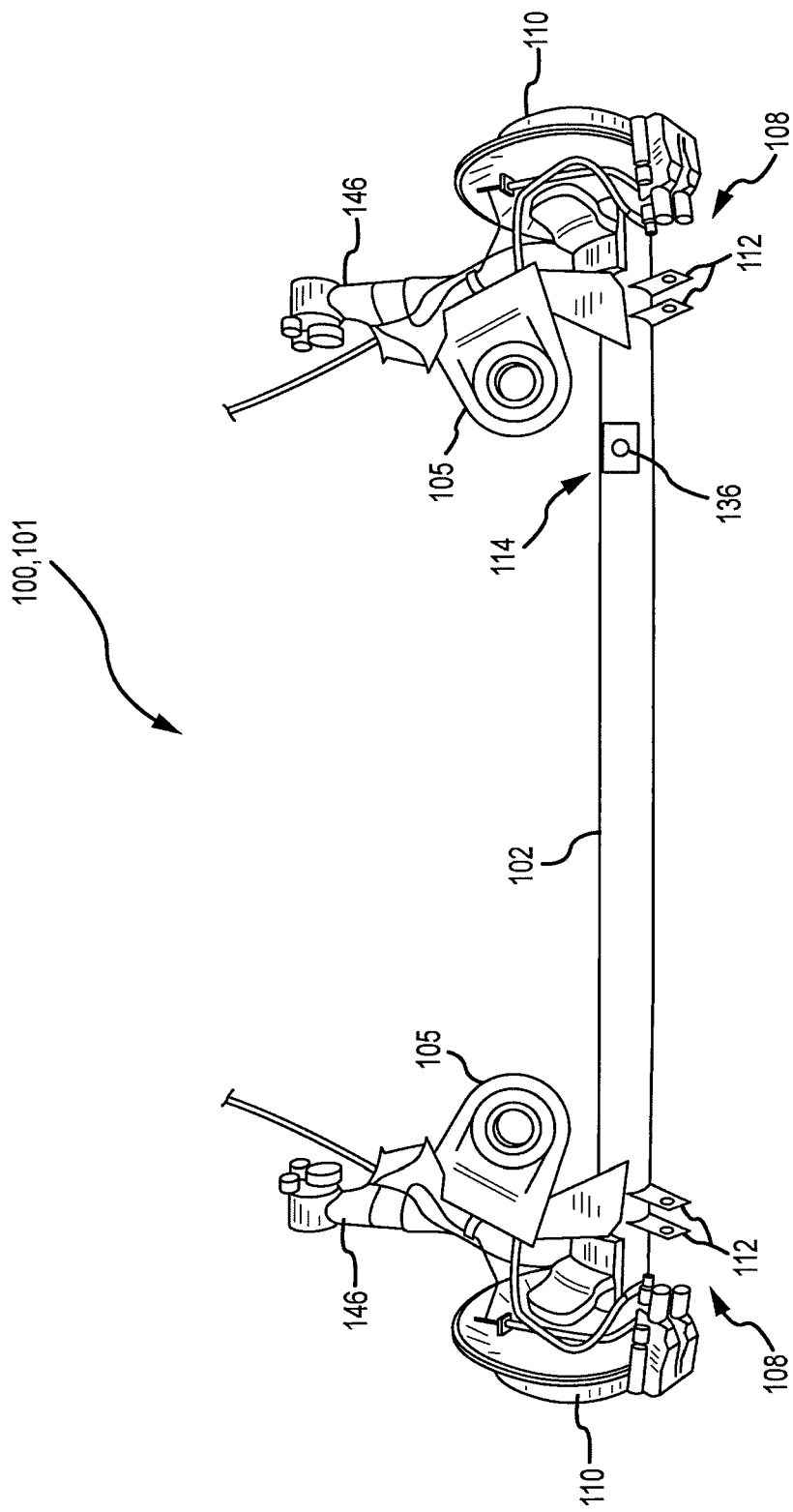
FIG. 4 depicts an embodiment of a modified rear axle of the present invention.
Figure 5:
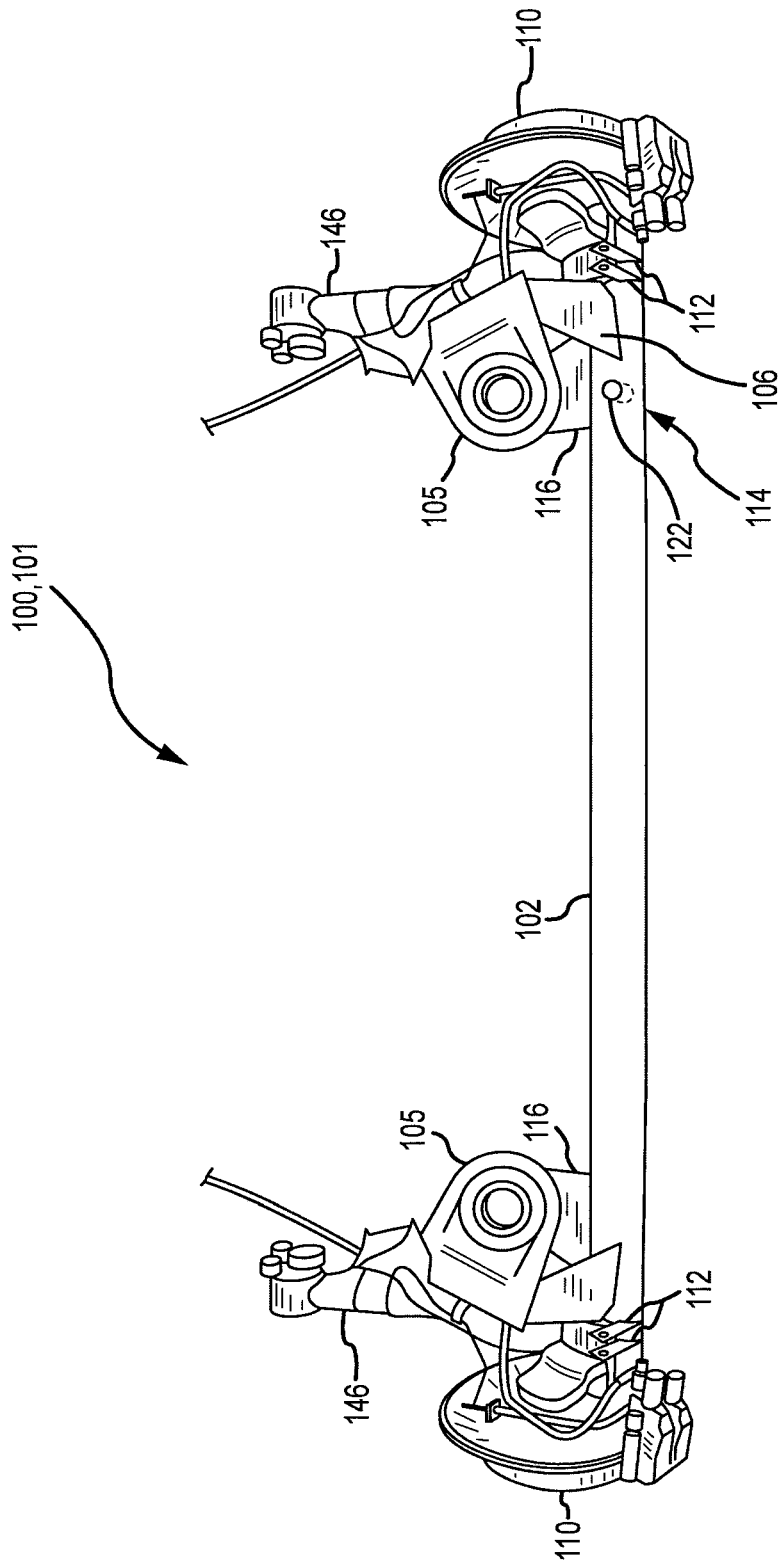
FIG. 5 depicts another embodiment of a modified rear axle of the present invention.
Figure 6:
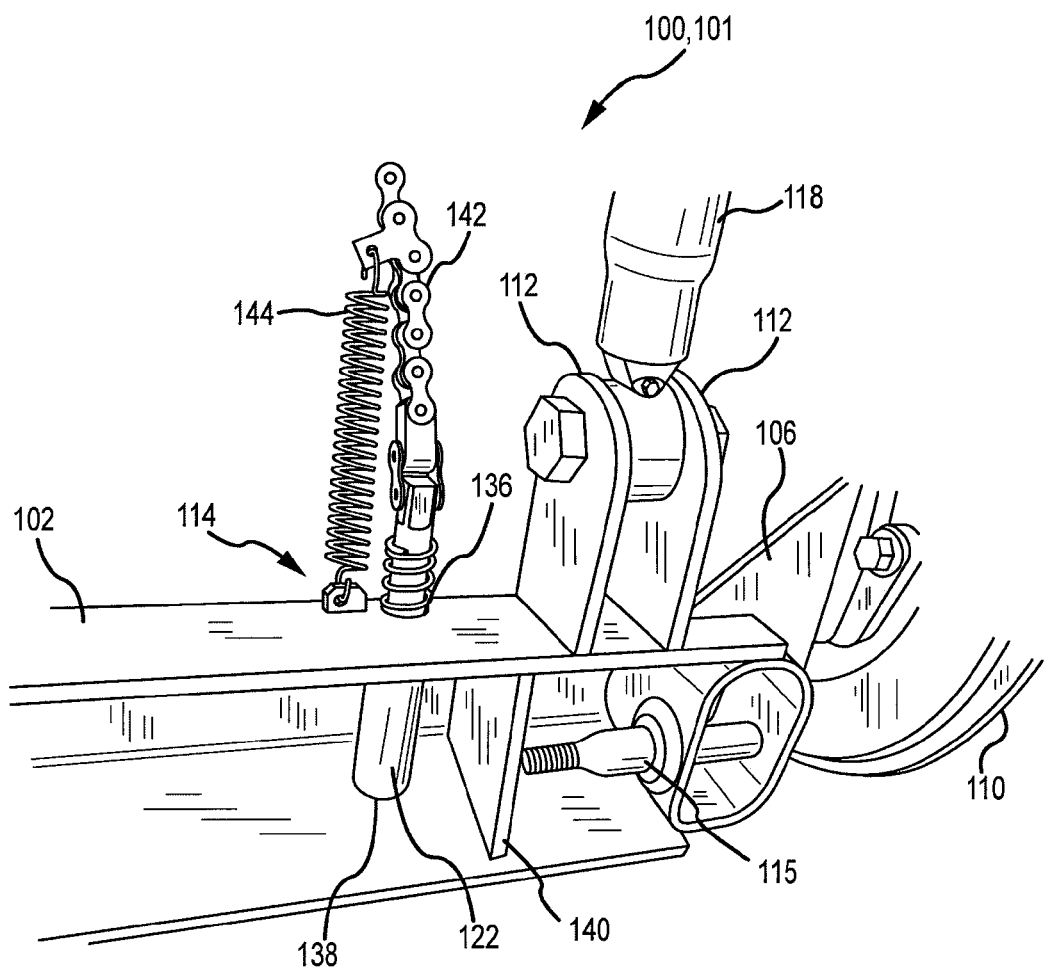
FIG. 6 depicts yet another embodiment of a modified rear axle of the present invention.
Figure 7:
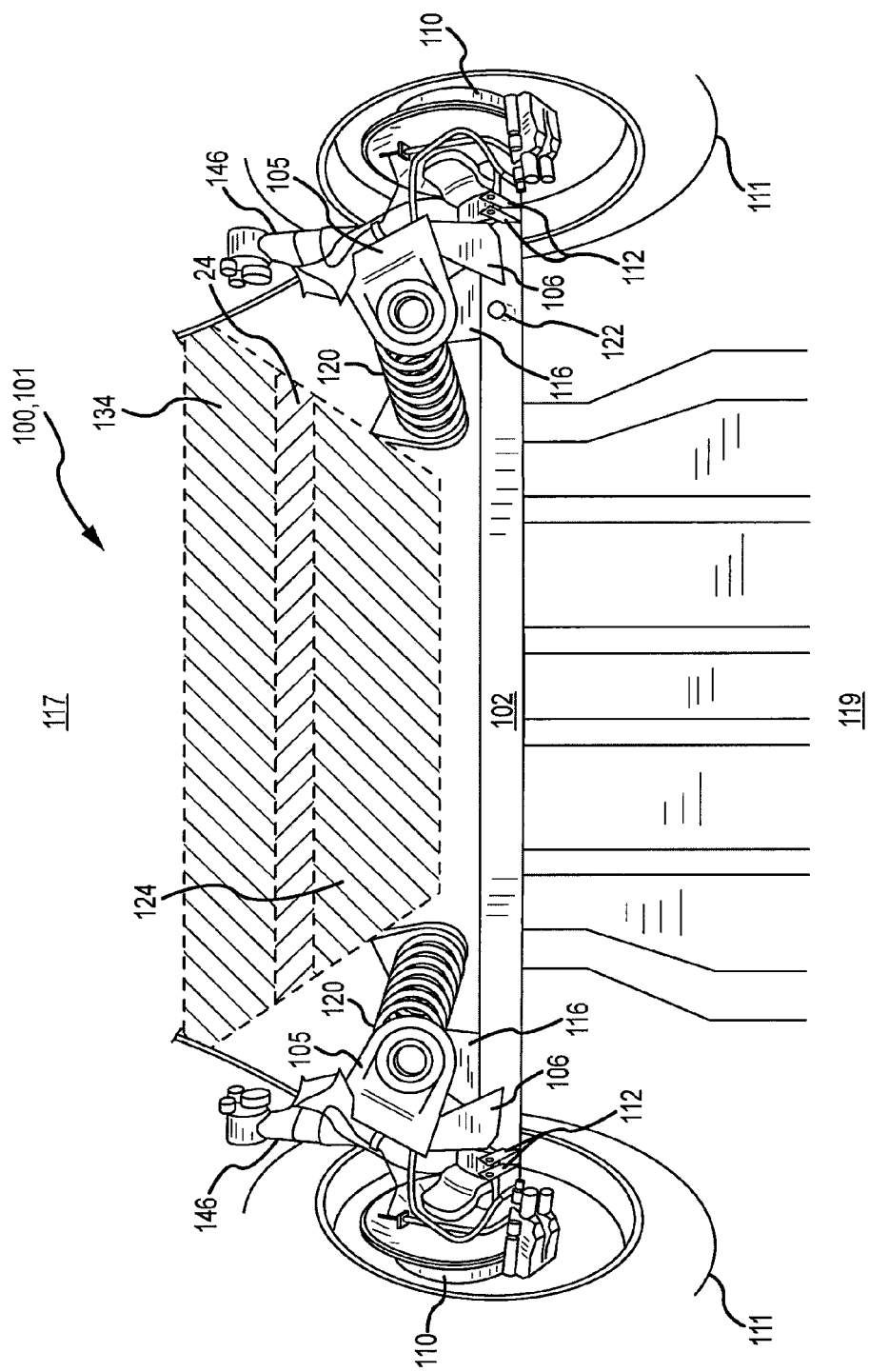
FIG. 7 shows an undercarriage view of an embodiment of a modified van according to the present invention, illustrating the manner in which the modified rear axle is installed to expand the amount of flat floor space available in the maneuvering area of the passenger compartment.

As shown in FIGS. 4-6, OEM modified van 100 comprises modified rear axle 101, that, when installed (e.g., as shown in FIG. 7) allows for increased additional flat floor space 124 within maneuvering area 124, 134 of passenger compartment 126, while substantially maintaining OEM specifications and/or proper wheel alignment of OEM van 10.

Modified rear axle 101 comprises modified axle beam 102, receptacle 114 and attachment assembly 108. Modified rear axle beam 102 is connected to brake assembly 110 of each rear wheel 111 and comprises a member that is substantially straight with its length dimension being greater than its width dimension or diameter. See FIG. 7. Modified rear axle 101 of the present invention may be preferably designed to mimic dynamic axial torsion characteristics of the OEM rear axle 11, including spring rate of the roll bar. Accordingly, modified rear axle beam 102 may be of any shape that provides dynamic axial torsion characteristics similar to that of the OEM rear axle 101. In embodiments, torsion rate may be in a range from about 30 pounds per inch to about 400 pounds per inch, preferably about 60 pounds per inch. The modified axle beam 102 may be in any suitable configuration, such as a tube or channel. In one embodiment shown in FIG. 4, modified axle beam 102 comprises a generally cylindrically shaped tube. In other embodiments shown in FIGS. 5 and 6, modified axle beam 102 comprises a C-shaped channel. Advantageously, as shown in FIG. 6, C-shaped channel modified rear axle beam 102 may be reinforced with torsional support gusset 140 along the interior of modified rear axle beam 102. In the embodiment shown, torsional support gusset 140 is located along the length of the modified rear axle beam 102 between receptacle 114 and shock mounts 112 and adjacent to original OEM shock mount 115, although other configurations are possible.

As is explained in more detail below, modified rear axle 101 comprises receptacle 114 in modified rear axle beam 102. Receptacle 114 may comprise aligned top and bottom holes 136, 138 or hollow tube 122 or other suitable device for receiving power kneel chain 142 and allowing it to pass through modified rear axle beam 102.

Attachment assembly 108 comprises components for attaching the modified rear axle 101 to modified OEM van's 100 rear suspension system, preferably, at a second position rearward of the location (e.g., first position) of OEM rear axle 11. Attachment assembly 108 comprises support bracket 106, coil spring attachment 105 and shock mount 112. In an embodiment shown in FIG. 5, attachment assembly 108 further comprises gusset 116 to further strengthen modified rear axle 101, including support bracket 106. Support bracket 106 may be attached to control arm 146, preferably near the rear of the control arm 16. Coil spring attachment 105 is attached to coil spring 120 and shock mount 112 is connected to shock absorber 118. Modified rear axle beam 102 may be installed in OEM modified van 100 in the second position rearward of the location of OEM rear axle beam 12. In embodiments shown in FIGS. 4-6, modified axle beam 102 is installed rearward of the coil spring attachment 105.

Modified OEM van 100 of the present invention, therefore, comprises modified rear axle 101 with the modified rear axle beam 102 moved rearward. While the OEM rear axle 11 may attach to the rear suspension system of the OEM van 10 at the rear wheel spindle attachment, modified rear axle 101 may be attached to the rear suspension system with support brackets 106 at a position rearward of the rear wheel spindle attachment, preferably at the rear section of control arm 146. Due to attachment of the modified rear axle beam 102 using support brackets 106, OEM pins 14 are unnecessary. Shock mounts 112 may be reestablished on the modified rear axle beam 102 in locations to mimic the ride characteristics of OEM van 10, as would be familiar to one of ordinary skill in the art after becoming familiar with the teachings of the present invention. In embodiments shown in FIGS. 4 and 5, shock mounts 112 are substantially perpendicular to support brackets 106; however, other configurations are possible.

Figure 8:
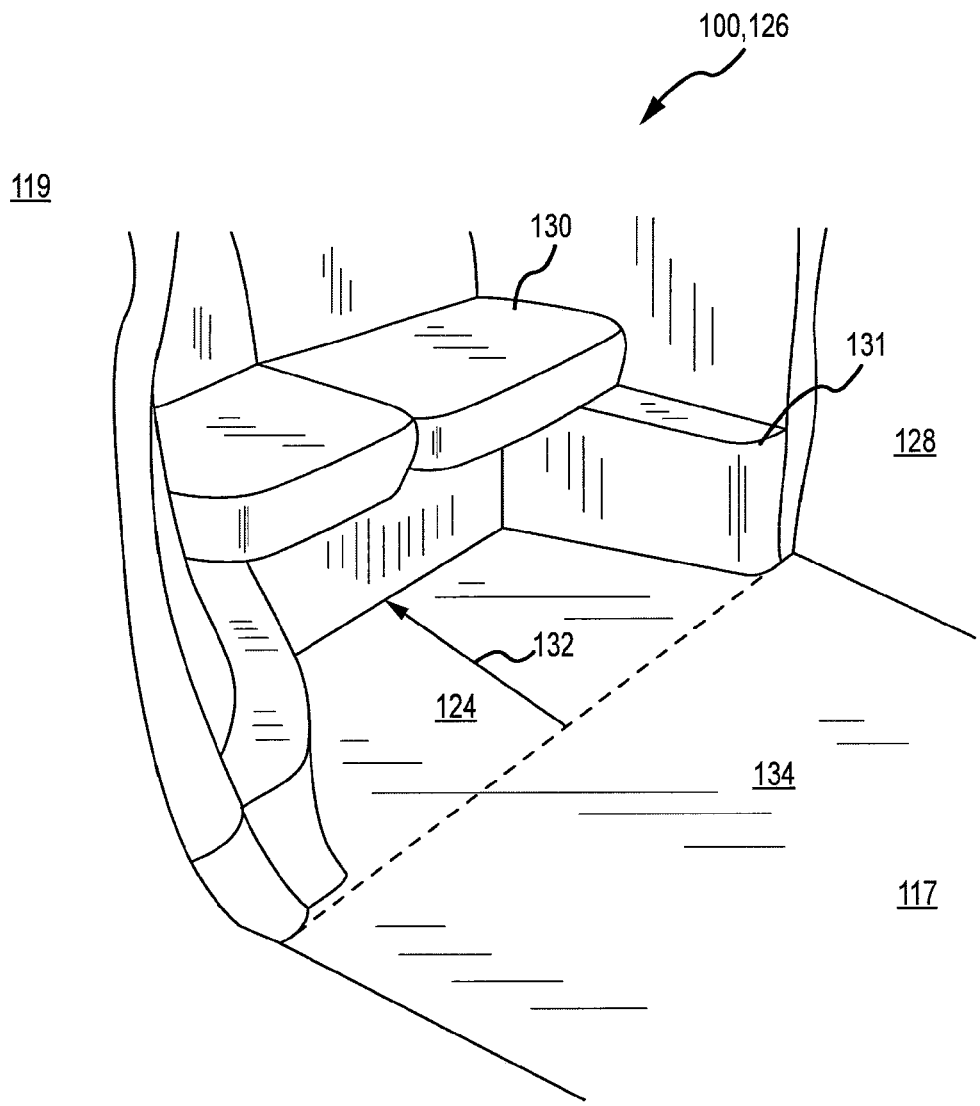
FIG. 8 shows expanded flat floor area within the maneuvering area of the passenger compartment of a modified vehicle after a modified rear axle of the present invention has been installed.
Figure 9:
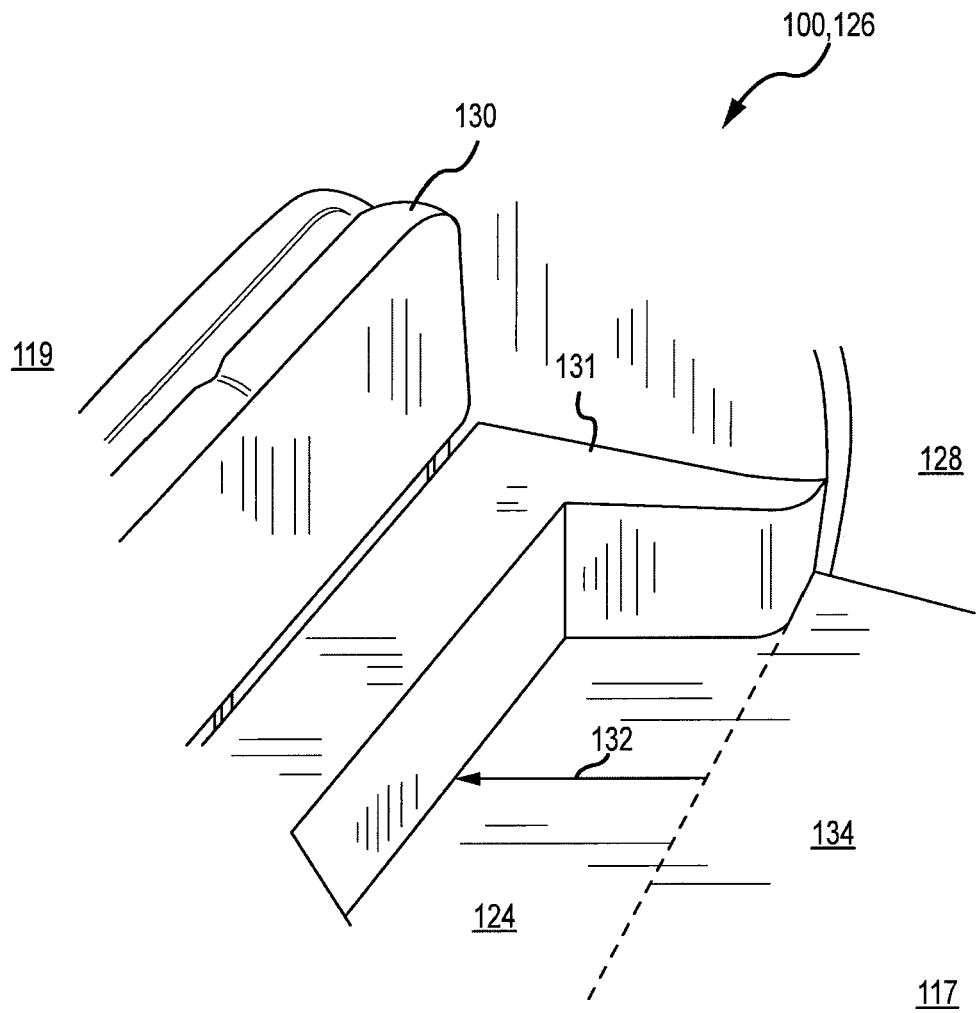
FIG. 9 shows an embodiment of a folding rear seat of the present invention.

Once modified rear axle beam 102 is repositioned in the second position rearward of the OEM rear axle beam 12 location (e.g., first position), available flat floor space may be greatly increased, as shown in FIGS. 7-9. Arrow 132 in FIGS. 8-9 shows the extent to which additional flat floor space 124 is increased over flat floor space 134 of OEM van 10. Preferably, modified rear axle beam 102 is moved rearward between about 12 and about 22 inches as compared to OEM rear axle beam 12 to permit the creation of additional flat floor space over OEM van 10 as shown in FIG. 7. In one embodiment, the modified rear axle beam 102 was moved rearward about 16.5 inches as compared to OEM rear axle beam 12. Accordingly, repositioning modified rear axle beam 102 rearward to the second position increases available flat floor space within the maneuvering area 124, 134 between about 200 and about 400 square inches. In one embodiment, additional flat floor space 124 was increased by about 300 square inches. Alternatively, the increase in flat floor space within the maneuvering area 124, 134 may be described as a percentage increase in flat floor space as compared to that of OEM van 10. In embodiments of the present invention, modified OEM van 100 comprises at least about a 380 percent increase in flat floor space within the maneuvering area. Preferably, flat floor space within the maneuvering area 124, 134 may be increased by at least about 440 percent.

It may be desirable for a wheel-chair accessible vehicle, such as modified OEM van 100, to have a kneeling capability to lower the body of the vehicle when a handicapped passenger desires to enter or exit the vehicle. The kneeling function may be accomplished through the use of power kneel chain 142 and spring 122 operatively associated with a power kneel mechanism. Power kneel chain 142 functions to pull the body of OEM modified van 100 closer to the axles, such as modified rear axle 101, thereby lowering the body of modified OEM van 100 closer to the ground. However, when modified rear axle 101 is repositioned rearward as has previously been described, such repositioning may impact the operation of the power kneel mechanism, specifically power kneel chain 142. Thus, in one embodiment, modified rear axle 101 comprises receptacle 114 for allowing power kneel chain 142 to pass through modified rear axle 102.

Receptacle 114 can be any suitable device or means that allows power kneel chain 142 to pass through modified rear axle 102 substantially unimpeded. Thus, receptacle 114 may simply comprise a hole cut or drilled through or otherwise provided in modified rear axle beam 102. In an embodiment shown in FIG. 4, receptacle 114 comprises a series of holes (e.g., two) drilled through modified rear axle beam 102.

In yet another embodiment shown in FIG. 5, receptacle 114 may comprise two holes with a tube inserted to connect them. Top hole 136 may be cut or drilled through an upper portion of modified rear axle beam 102 and bottom hole 138 may be cut or drilled through a lower portion of modified axle beam 102. In the embodiment shown, receptacle 114 also comprises a channel or hollow tube 122 inserted into and connecting top hole 136 and bottom hole 138. In that embodiment, top hole 136 and bottom hole 138 are substantially perpendicularly aligned to the length of modified rear axle beam 102; however, the invention should not be viewed as being limited in this respect. Accordingly, power kneel chain 142 may pass through top hole 136 and exit through bottom hole 138 while encased in tube 122.

As discussed above, relocation of the modified rear axle beam 102 in the modified OEM van 100 allows for increase in additional flat floor space 124 rearward within the maneuvering area 124, 134 of passenger compartment 126. Nonetheless, the OEM rear seat 30 location may interfere with the user's ability maneuver the wheelchair within the maneuvering area 124, 134. As seen in FIG. 8, OEM rear seat 30 may hang over the newly created additional flat floor space 124. Accordingly, modified OEM van 100 may comprise modified OEM rear seat 130. In one embodiment, OEM rear seat 130 may be moved rearward on a modified rear seat frame structure 131. Or, in another embodiment, modified OEM rear seat 130 may be converted into a folding rear seat in order to maximize available flat floor space 124, 134. As is known, OEM rear seat 30 attaches to the body of OEM van 10 through front mounts (not shown) and back mounts (not shown) located on the OEM rear seat frame structure 31. Modified OEM rear seat 130 comprises at least one releasable latch (not shown) in a position corresponding to the front mount of OEM rear seat frame structure 31 and at least one pivoting mount (not shown) in a position corresponding to the back mount of the OEM rear seat frame structure 31. The pivoting mount may have locking position whereby modified rear seat 130 may be locked into a folded (up) position, as shown in FIG. 9. In another embodiment, the releasable latch may be attached to a cable release mechanism that enables the user to pull on a cable to release modified OEM rear seat 130 from an unfolded position to the folded position, as shown in FIG. 9, to allow the wheelchair more space to maneuver in the newly created additional flat floor space 124 within the maneuvering area 124, 134.

In an alternative embodiment, modified OEM van 100 may comprise modified rear seat 130 and modified rear seat frame structure wherein the modified rear seat frame structure is moved rearward (e.g. to a second position) in relation to the position (e.g., first position) of OEM rear seat frame structure 31. Proper operation of a passenger restraint system riding in the rearmost seat, however, could be compromised by relocation of the OEM rear seat 30 too far rearward. Thus, the second position of the modified rear seat frame structure may be moved rearward so long as the second position does not compromise proper operation of the passenger restraint system. Accordingly, the second position of the modified rear seat frame structure may be located no more than about three inches rearward of the corresponding first position. In one embodiment, the modified rear seat frame structure was moved rearward by about 2.5 inches.

Figure 10:
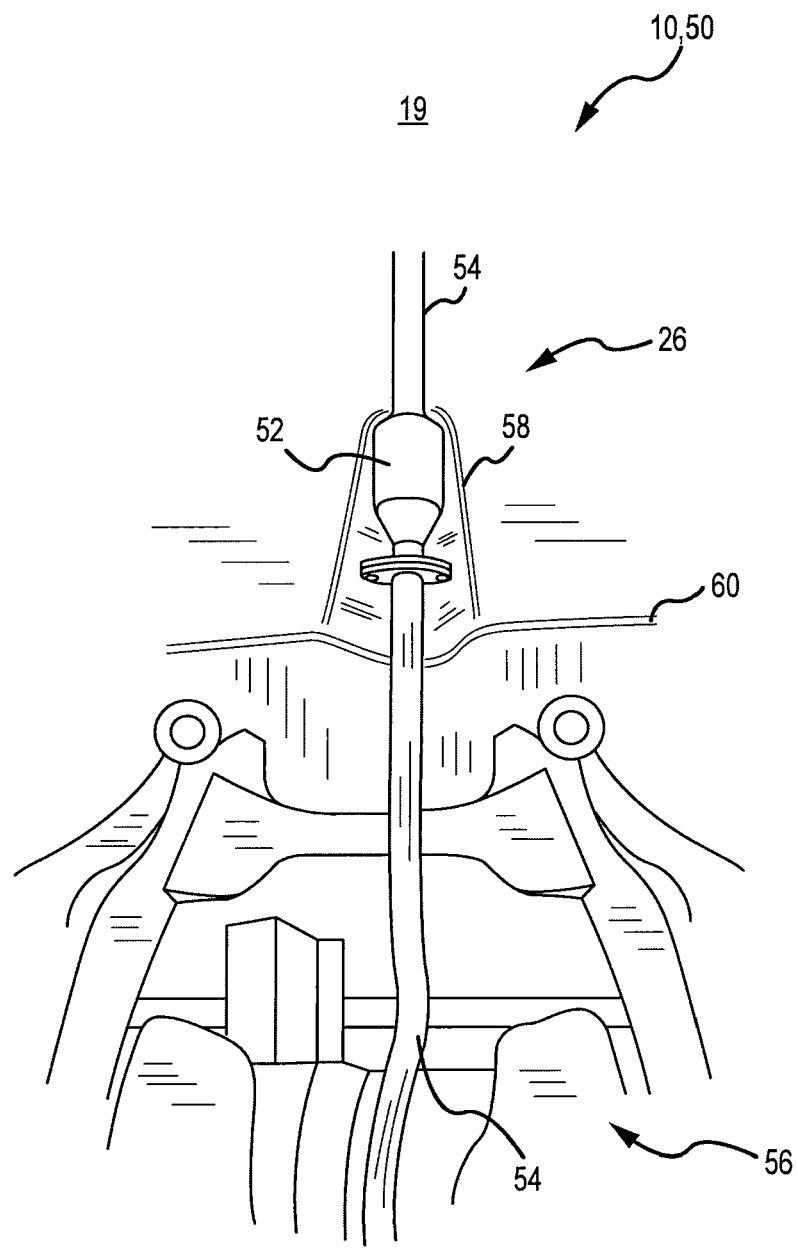
FIG. 10 shows an OEM exhaust system configuration, including location of the secondary catalytic converter.
Figure 11:
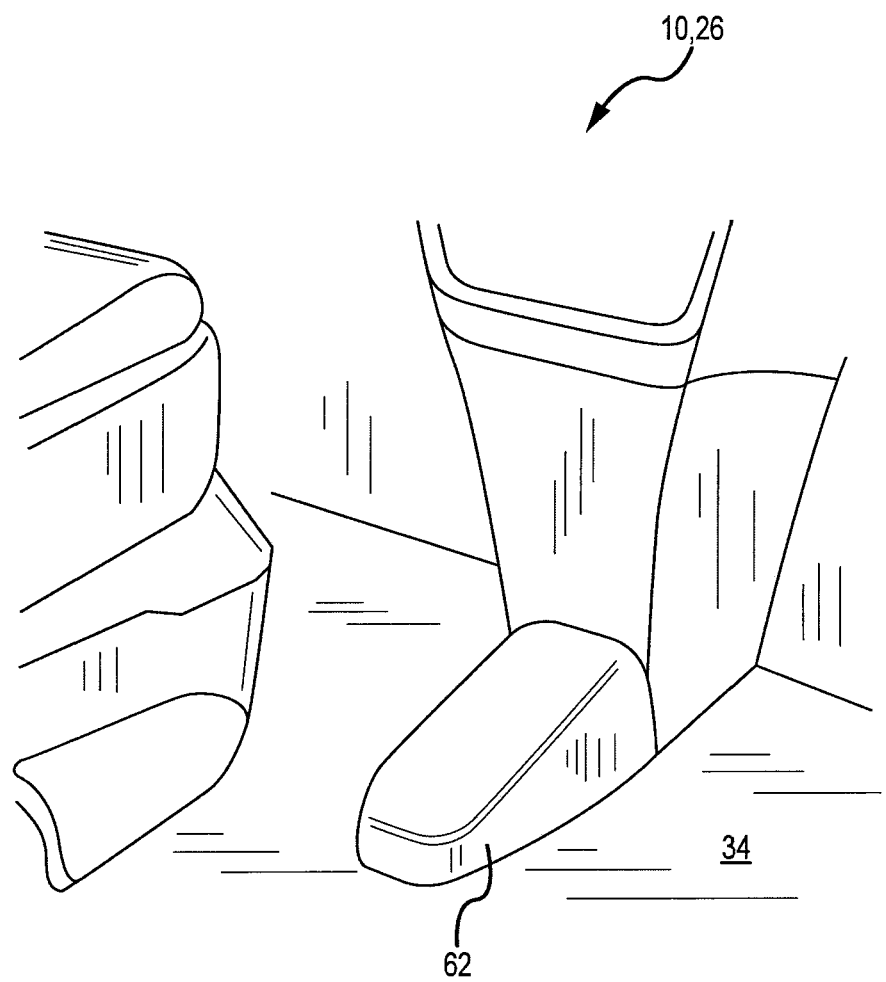
FIG. 11 shows a hump in the floor of an OEM vehicle.

In certain embodiments, exhaust system 50 of the OEM van 10 may also interfere with the available flat floor space within the maneuvering area 24, 34 of the OEM van 10. For example, as shown in FIG. 10, secondary catalytic converter 52 and heat shield 58 may be located underneath passenger compartment 26 and rearward of firewall 60 which separates passenger compartment 26 from the engine compartment 56 of OEM van 10. As the floor of passenger compartment 126 is lowered during modification of OEM van 10 according to embodiments of method 300 of the present invention, secondary catalytic converter 52 intrudes into available flat floor space within the maneuvering area 124, 134. Previously, secondary catalytic converter 52 was accommodated by creating hump 62 in the floor, as seen in FIG. 11. Hump 62 creates a large obstruction for the handicapped user, limiting the user's ability to maneuver the wheelchair inside the maneuvering area 134 and preventing access to the front of the maneuvering area 134.

Figure 12:
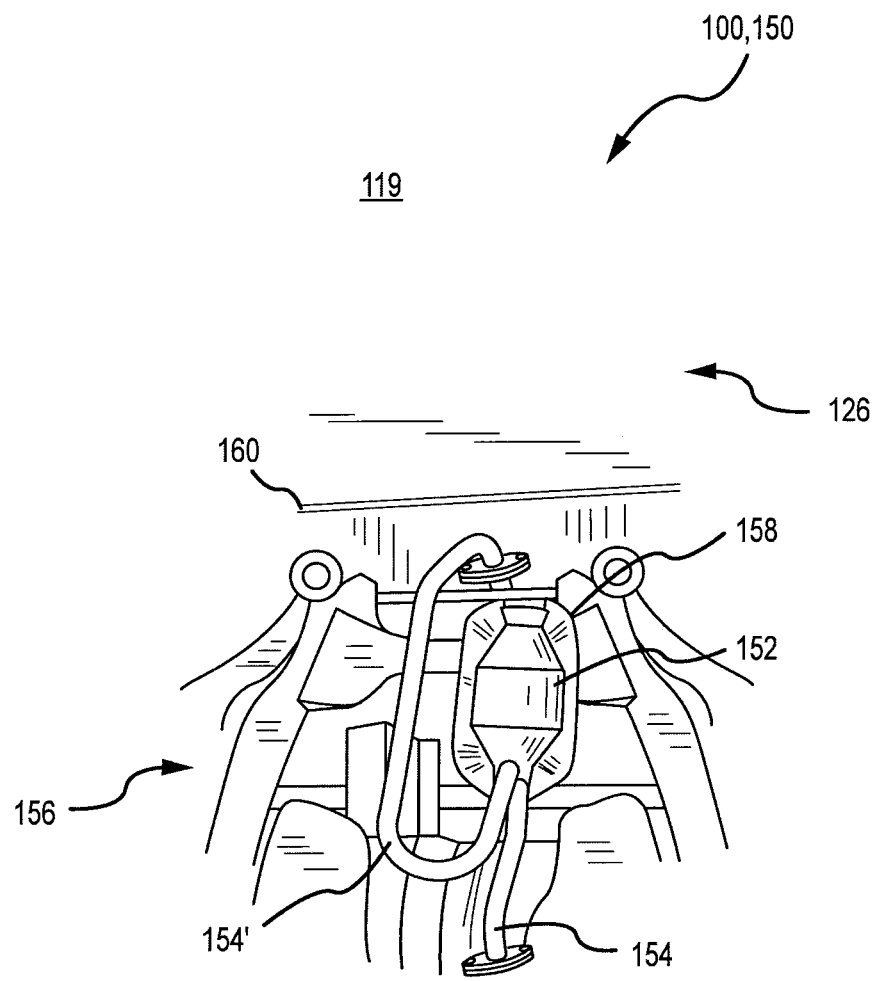
FIG. 12 shows a modified exhaust system according to one embodiment of the present invention in which the secondary catalytic converter is repositioned forward of the firewall.

Thus, another embodiment of modified OEM van 100 comprises modified exhaust system 150. In modified exhaust system 150, the secondary catalytic converter 152 is repositioned forward of firewall 160 and the underside of passenger compartment 126 within engine compartment 156, as shown in FIG. 10. Advantageously, heat shield 158 may be added between the secondary catalytic converter 152 and engine components to minimize heat transfer and maintain proper operation; however, heat shield 158 is not required. Comparing FIG. 12 with FIG. 10, existing OEM exhaust pipe 54 (FIG. 10) remains connected to the exhaust manifold; however, OEM exhaust pipe 54 is cut into modified exhaust pipe 154 to accommodate the new location of secondary catalytic converter 152. Additional exhaust pipe 154' is connected to secondary catalytic converter 152 and added to modified exhaust system 150, as shown in FIG. 12. This modification allows for flat flooring across the front of the maneuvering area 124, 134 within the interior compartment of modified OEM van 100, enhancing access and maneuverability of the wheelchair inside modified OEM van 100.

Repositioning secondary catalytic converter 152 forward of firewall 160 may cause secondary catalytic converter 152 to be located in a position lower to the ground than in the configuration of OEM van 10. Therefore, the body of modified OEM van 100 may be raised by installing a lift kit as would be familiar to one of ordinary skill in the art after becoming familiar with the teachings of the present invention, thereby substantially maintaining ground clearance of OEM modified van 100. As may be recognized by those of ordinary skill in the art, any disadvantage in handicapped access to the raised modified OEM van 100 vehicle can be minimized by lowering the floor of the interior compartment and/or through kneeling the vehicle during entry and exit, using the power kneel mechanism previously described.

Figure 13:
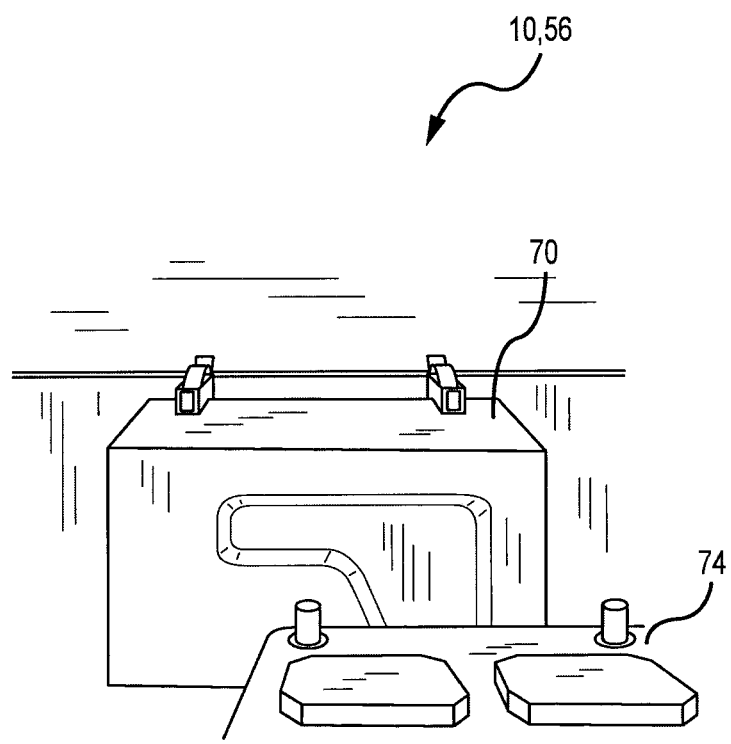
FIG. 13 shows the location of the OEM airbox when the vehicle is raised, causing misalignment of the airbox with the OEM air intake system.
Figure 14A:
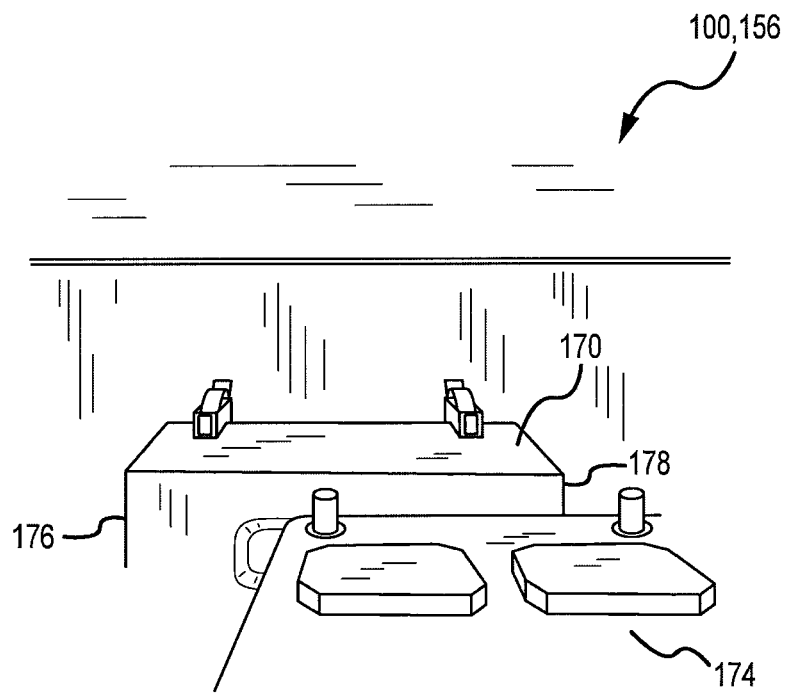
FIGS. 14 (A) and (B) show the location of the airbox according to one embodiment of the present invention wherein the airbox is lowered reestablishing alignment with the OEM air intake system.
Figure 14B:
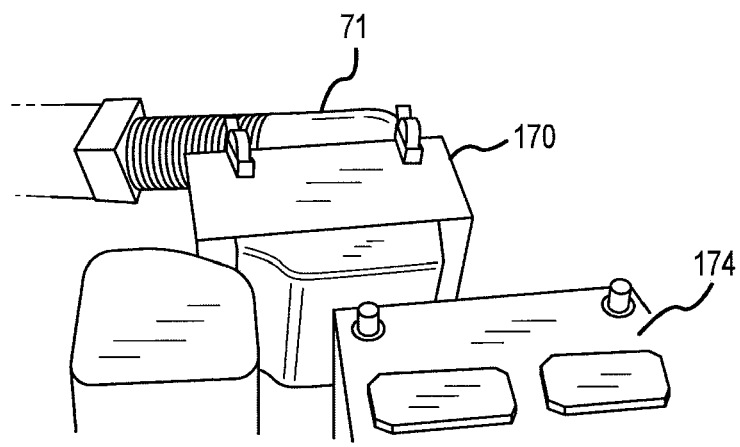
Figure 15:
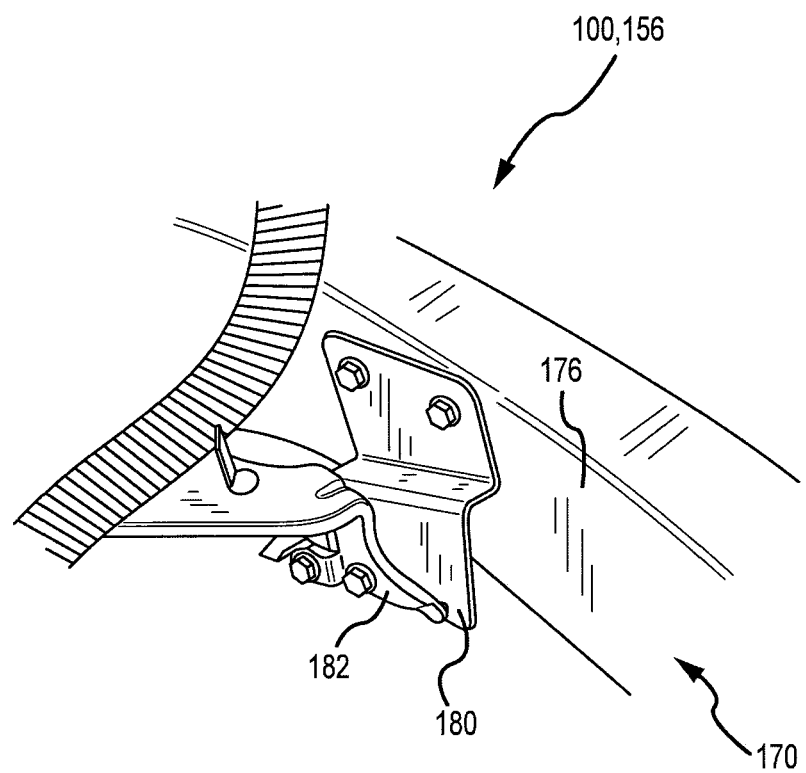
FIG. 15 shows the manner in which the modified airbox is attached to the side of the engine compartment, according to an embodiment of the present invention.
Figure 16:
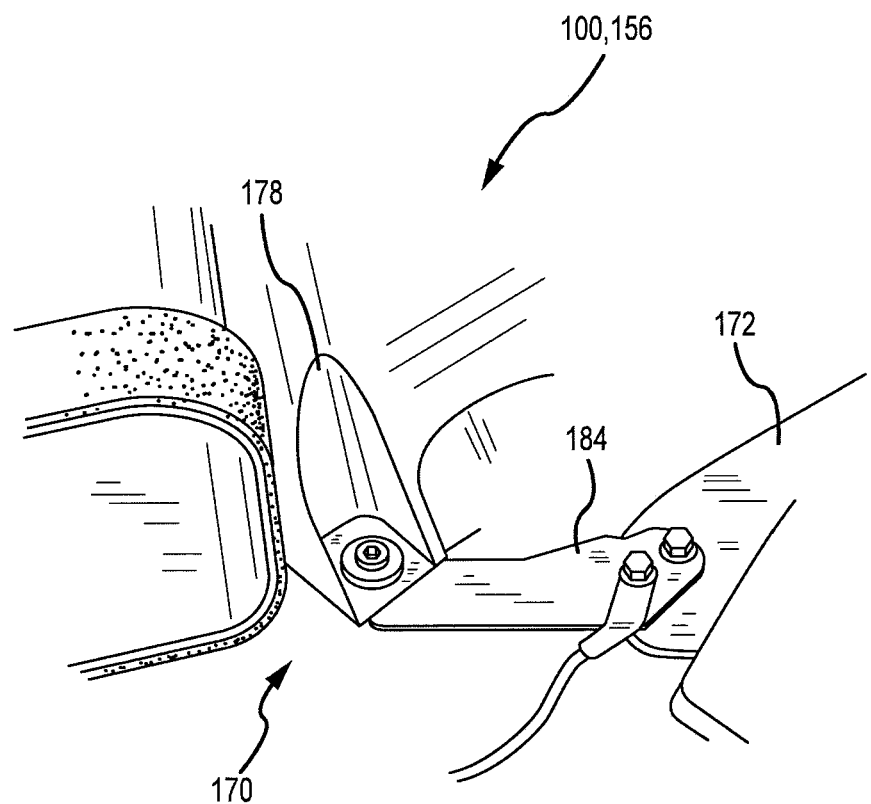
FIG. 16 shows the manner in which the modified airbox is attached to the original meeting surface according to an embodiment of the present invention.

However, raising the body of OEM van 10 may also raise air box 70 and distort OEM air intake alignment. OEM airbox 70 mounts independently from the engine and attaches to meeting surface 72 within engine compartment 56. As seen in FIG. 13, raising OEM van 10 may cause airbox 70 to mount substantially above its proper alignment within engine compartment 56 (as seen by using battery 74 as a reference point). Thus, in another embodiment, OEM modified van 100 comprises a lowered, modified airbox 170 within engine compartment 156 that properly aligns with the OEM air intake system 71, as shown in FIG. 14 (as seen using battery 174 as a reference point). As seen in FIGS. 14-16, modified airbox 170 comprises first side 176 and second side 178. First side 176 of modified airbox 170 is mounted on interior side 182 of the engine compartment 156 with first modified bracket 180. Second side 178 of modified airbox 170 is attached to original meeting surface 172 using second modified bracket 184. First modified bracket 180 and second modified bracket 184 may comprise any material strong enough to hold modified airbox 170 in place when modified OEM van 100 is in motion. As would be familiar to one of ordinary skill in the art after becoming familiar with the teachings of the present invention, first and second modified brackets 180, 184 may be configured to be removably attached through use of nuts, bolts, or other fasteners. In another embodiment, a mounting foot of airbox 70 is removed in modified airbox 170.

Figure 17:
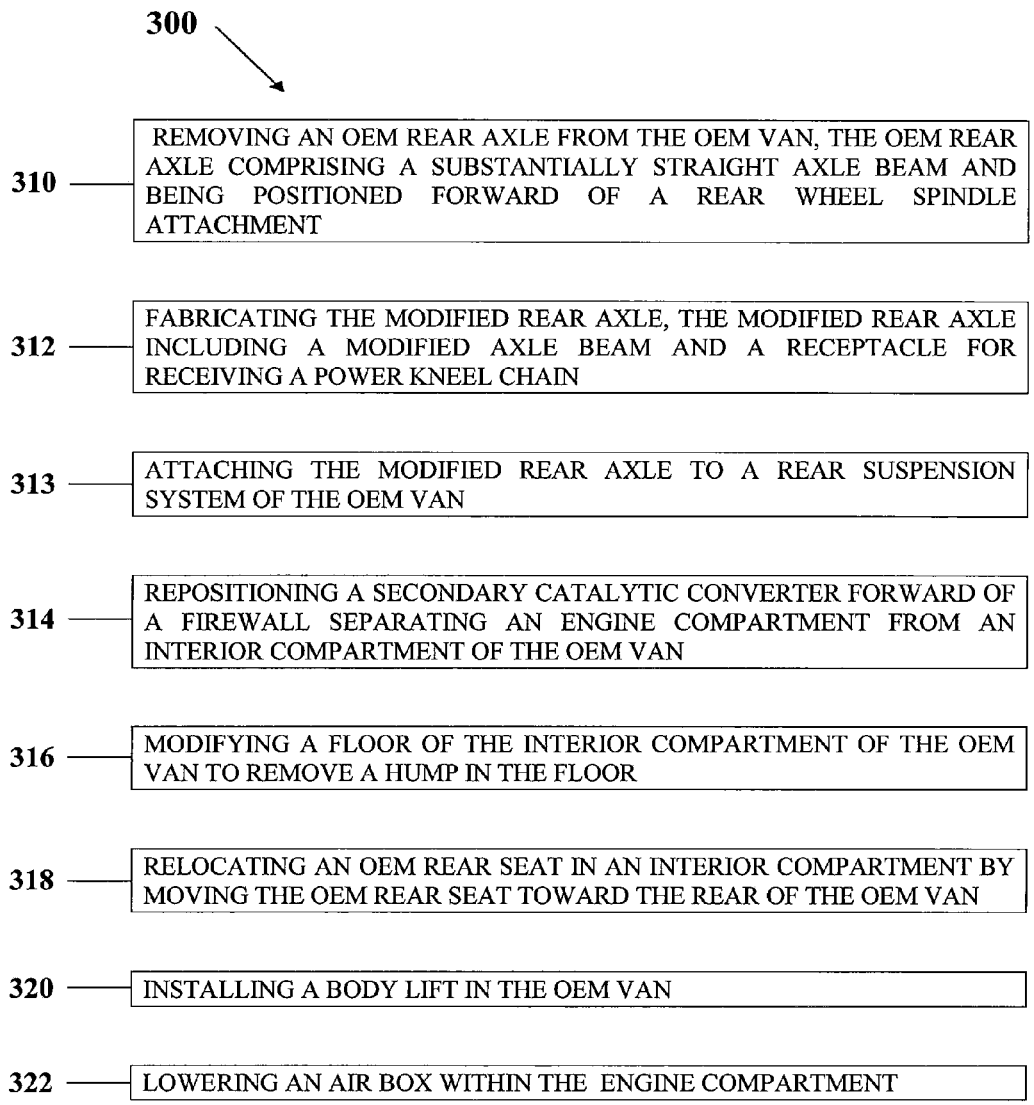
FIG. 17 illustrates steps of an embodiment of the method of the present invention.

The present invention also comprises embodiments of method 300 for converting OEM van 10 to modified OEM van 100, which will now be discussed with reference to FIG. 17.

Method 300 comprises replacing OEM rear axle 11 with modified rear axle 101. Therefore, method 300 comprises fabricating 312 modified rear axle 101, including modified rear axle beam 102 of the present invention and receptacle 104 for receiving power kneel chain 142. As discussed above, modified rear axle 101 may be any modified rear axle 101 described herein or subject to additional modifications and variations in design that would occur to one of ordinary skill in the art after becoming familiar with the teachings of the present invention. Thus, fabricating step 312 may comprise reinforcing attachment assembly 108 of modified rear axle 101 with at least one support bracket, such as support bracket 106. Additionally, attachment assembly 108 may also be reinforced with at least one gusset 116. Fabricating step 312 of the present invention may also comprise reattaching shock mount 112 on the modified rear axle 102 in the locations previously described and shown in FIGS. 4-6. Shock mounts 112 are preferably fixedly attached to modified rear axle 101 by welding, although other suitable fastening means may also be used.

As mentioned above, fabricating 312 modified rear axle beam 104 may comprise fabricating receptacle 114 for receiving power kneel chain 142. Fabricating receptacle 114 comprises drilling, cutting or otherwise providing at least one hole in modified rear axle beam 101. In one embodiment shown in FIG. 6, fabricating receptacle 114 comprises drilling, cutting or otherwise providing two holes, top hole 136 cut or drilled through the upper portion of the modified rear axle beam 101 and bottom hole 138 cut or drilled through the lower portion of modified rear axle beam 101. Fabricating receptacle 114 further comprises fixedly attaching a channel or hollow tube 122 between top hole 136 and bottom hole 138. In one embodiment, receptacle 114 was fabricated with top and bottom holes 136, 138 aligned substantially perpendicularly to the length of the modified axle beam 102. Thus, the channel or hollow tube 122 is also so substantially perpendicularly aligned. The invention, however, should not be viewed as being limited in this respect.

Modified rear axle 101 having been fabricated 312, method 300 further comprises attaching 313 modified rear axle 101 to the rear suspension of OEM van 10 in a second location rearward of the location of OEM rear axle 11 (e.g., first location). In one embodiment, modified rear axle 101 was fixedly attached 313 to the rear section of rear control arm 146 operatively associated with the rear suspension system of OEM van 10. Preferably, modified rear axle 101 is fixedly attached with strong and permanent connection means (e.g., welding), although the invention should not be viewed as being limited in this respect. In one embodiment, method 300 further comprises attaching 313 modified rear axle 101 to control arm 146 (rearward of the location of OEM rear axle 11) with OEM rear axle 11 still in place to maintain the structural points of attachment to the vehicle. As mentioned above, in one embodiment, OEM rear axle 11 comprises a substantially straight axle beam positioned forward of the rear wheel spindle attachment 16.

Support bracket(s) 146 are also used to attach modified rear axle beam 101 to the rear suspension of OEM van 10 to strengthen the attachment of modified rear axle 101 and mimic the ride characteristics of an OEM vehicle. Support bracket(s) 146 may also be fixedly attached to the modified rear axle by welding or by other fastening means familiar to one of ordinary skill in the art after becoming familiar with the teachings of the present invention. In addition, attaching 313 modified rear axle 101 may comprise connecting coil spring attachment 105 to coil spring 120. Method 300 may further comprise making adjustments, such as using shims or changing the dimensions of components, to properly install modified rear axle 101 in modified OEM van 100. For example, in one embodiment, when modified OEM van 100 was raised, the use of longer coil springs 120 was advantageous.

In one embodiment, after modified rear axle 101 has been fixedly attached 313 according to embodiments of method 300, OEM rear axle 11 may then be removed.

Method 300 may further comprise reconfiguring exhaust system 50 to make modified exhaust system 150. Thus, method 300 may comprise repositioning 314 the secondary catalytic converter 152 forward of firewall 160 separating engine compartment 156 from passenger compartment 126. In one embodiment, method 300 may also comprise installing heat shield 158 between repositioned secondary catalytic converter 152 and the engine. Repositioning 314 secondary catalytic converter 152 may comprise shortening exhaust pipe 54 into modified exhaust pipe 154 to connect the manifold to secondary catalytic converter 152 and installing additional exhaust pipe 154' to connect the secondary catalytic converter 152 to modified exhaust system 150, such as is shown in FIG. 12. The exhaust system, including the secondary catalytic converter 152, may be reconfigured using techniques known to those skilled in the art. Similarly, heat shield 158 may be installed using techniques known to those of ordinary skill in the art.

With the secondary catalytic converter 152 repositioned and exhaust system 150 reconfigured, method 300 further comprises the step of modifying 316 the floor of passenger compartment 126. Modifying the flat floor space 134 of passenger compartment 126 comprises increasing the additional flat floor space 124 in maneuvering area 124, 134 of modified OEM van 100. Modifying 316 the floor of passenger compartment 126 may comprise removing hump 62 present in OEM van 10 or in other converted OEM vans. Modifying 316 the floor may comprise increasing the additional flat floor space 124 by between about 200 to about 400 square inches or by between about 380 percent and about 440 percent in the maneuvering area 124, 134 over OEM van 10, as has been previously described. Modifying the floor may also comprise lowering the floor within passenger compartment 126 of modified OEM van 100.

To further enhance the room in passenger compartment 126, method 300 may further comprise modifying OEM rear seat 30. In the embodiments described herein, OEM rear seat 30 may be modified by relocating 318 OEM rear seat 30 to make modified OEM rear seat 130, or by converting OEM rear seat 30 into modified OEM rear seat 130 that folds up.

As part of method 300, the relocating 318 step may comprise moving OEM rear seat 30 to the second position rearward of OEM rear seat's 30 original location (e.g., first position) in passenger compartment 126. Thus, relocating 318 may comprise removing OEM rear seat 30 and constructing modified rear seat support frame structure in the second position. The second position is located rearward of the first position but not so far rearward as to compromise the proper operation of the OEM restraint system. Thus, the second position of the modified rear seat support frame structure may be located no more than about three inches rearward of the first position. In one embodiment, the modified rear set support frame structure was moved rearward by about 2.5 inches. Once the modified rear seat support frame structure has been moved rearward, OEM rear seat 30 is reattached to modified rear seat frame structure to make modified OEM rear seat 130.

In another embodiment, modifying OEM rear seat 30 comprises fabricating a folding modified rear seat 130. OEM rear seat 30 is removed from a position in passenger compartment 126. Method 300 further comprises installing the releasable latch positioned at the location of each front mount of the OEM rear seat, as well as installing the pivoting mount positioned at the location of each back mount of the OEM rear seat 30. The cable release mechanism may also be attached to the releasable latches. The pivoting mount may be equipped and installed with a locking position that allows modified OEM rear seat 130 to be folded up and locked in place to provide more interior space. After the releasable latches, cable release mechanism, and pivoting mounts have been installed, the OEM rear seat becomes folding modified OEM rear seat 130. Thus, fabricating the folding modified OEM rear seat 130 also comprises the step of installing folding modified OEM rear seat 130 substantially back in the same position of passenger compartment 126 as that originally occupied by OEM rear seat 30.

As explained previously, repositioning 314 secondary catalytic converter 152 forward of firewall 160 may cause secondary catalytic converter 152 to be located in a lower position than in the OEM van 10 configuration. Thus, in another embodiment, method 300 may comprise raising the body of modified OEM van 100 by installing body lift (e.g., a lift kit). Preferably, raising the body of modified OEM van 100 the vehicle substantially maintains ground clearance of the modified OEM van 100.

Raising the body of modified OEM van 100, however, may cause misalignment between airbox 70 and the OEM air intake system. Thus, method 300 may further comprise lowering 322 airbox 70 within engine compartment 156, resulting in modified airbox 170. According to an embodiment of method 300, lowering 322 airbox 70 comprises fabricating first modified bracket 180 and second modified bracket 184 of any material suitable in strength and durability to hold modified airbox 170 in place during vehicle operation. First modified bracket 180 may be configured to removably attach the first side 176 of modified airbox 170 to the interior side 182 of engine compartment 156 using bolts, screws, nuts or other suitable fasteners; the second modified bracket 184 may be configured to removably attach the second side 178 of modified airbox 170 to the original meeting surface 172. In some embodiments, lowering 322 airbox 70 comprises removing the mounting foot of airbox 70. Lowering 322 airbox 70 further comprises removably attaching first side 176 of modified airbox 170 to the interior side 182 of engine compartment 156 using first modified bracket 180, as well as removably attaching second side 178 of modified airbox 170 to original meeting surface 172 using second modified bracket 184.

Having herein set forth the various embodiments of the present invention, it is anticipated that suitable modifications can be made thereto which will nonetheless remain within the scope of the invention. The invention shall therefore only be construed in accordance with the following claims:

What is claimed is:

1. A method for modifying an OEM van, comprising:
    removing an OEM rear axle from the OEM van, the OEM rear axle being positioned forward of a rear wheel spindle attachment;
    attaching a modified rear axle to a rear section of a rear control arm operatively associated with a rear suspension system of the OEM van;
    repositioning a catalytic converter from a position rearward of a firewall to a position forward of the firewall, wherein the firewall separates an engine compartment from an interior compartment of the OEM van; and
    modifying a floor of the interior compartment to remove a hump in the floor.

2. The method of claim 1, further comprising fabricating the modified rear axle, the modified rear axle comprising a modified axle beam and a receptacle for receiving a power kneel chain.

3. The method of claim 2, wherein the fabricating the modified rear axle comprises:
creating a top hole in an upper portion of the modified axle beam;
creating a bottom hole in a lower portion of the modified axle beam; and connecting the top hole with the bottom hole by inserting a hollow tube between the top hole and bottom hole thereby creating the receptacle.

4. The method of claim 2, wherein the fabricating comprises reestablishing a pair of shock mounts on the modified rear axle.

5. The method of claim 2, wherein the fabricating comprises reinforcing an attachment assembly of the modified rear axle with at least one support bracket.

6. The method of claim 2, wherein the fabricating comprises reinforcing an attachment assembly of the modified rear axle with at least one gusset.

7. The method of claim 1, further comprising:
after the modifying of the floor, removing an OEM rear seat from a position in the interior compartment; and
installing a folding rear seat substantially back in the position in the interior compartment.

8. The method of claim 1, further comprising relocating an OEM rear seat in the interior compartment by moving the OEM rear seat toward the rear of the interior compartment.

9. The method of claim 1, further comprising installing a body lift in the OEM van.

10. The method of claim 9, further comprising lowering an airbox within the engine compartment, comprising:
fabricating a first modified bracket, the first modified bracket being configured to attach to a side of the engine compartment and to the airbox on a first side;
fabricating a second modified bracket, the second modified bracket being configured to attach to an original meeting surface and to the airbox on a second side;
attaching the first side of the airbox to the side of the engine compartment with the first modified bracket; and
attaching the second side of the airbox to the original meeting surface with the second modified bracket.

11. The method of claim 10, further comprising removing a mounting foot of the air box.

12. The method of claim 1, further comprising fabricating the modified rear axle, the modified rear axle being substantially straight member whose length dimension exceeds its width dimension and having dynamic axial torsional characteristics that are substantially similar to those of the OEM rear axle.

13. The method of claim 12, wherein the dynamic axial torsional characteristics comprise a torsion rate in a range between about 60 pounds per inch to about 400 pounds per inch.

14. The method of claim 12, wherein the fabricating comprises reinforcing an attachment assembly of the modified rear axle with at least one support bracket and reestablishing a pair of shock mounts on the modified rear axle.

15. The method of claim 12, wherein the fabricating comprises reinforcing an attachment assembly of the modified rear axle with at least one gusset and reestablishing a pair of shock mounts on the modified rear axle.

16. A method for modifying an OEM van, the OEM van having a rear suspension system, an engine compartment and an interior compartment, comprising:
removing an OEM rear axle from the OEM van, the OEM rear axle being positioned forward of a rear wheel spindle attachment;
fabricating a modified rear axle comprising a modified axle beam by:
creating a top hole in an upper portion of the modified axle beam;
creating a bottom hole in a lower portion of the modified axle beam; and
connecting the top hole with the bottom hole by inserting a hollow tube between the top hole and bottom hole thereby creating a receptacle for receiving a power kneel chain;
attaching the modified rear axle to a rear section of a rear control arm operatively associated with the rear suspension system;
repositioning a catalytic converter from a position rearward of a firewall to a position forward of the firewall, wherein the firewall separates an engine compartment from an interior compartment of the OEM van;
after the repositioning, modifying a floor of the interior compartment to remove a hump in the floor to make a modified floor; and
reinstalling the modified floor in the interior compartment.

* * * * *